(12) United States Patent
Yang et al.

(10) Patent No.: US 11,997,030 B2
(45) Date of Patent: May 28, 2024

(54) ARCHITECTURE FOR NON-COHERENT COMMUNICATION IN WIRELESS NETWORKS

(71) Applicant: QUALCOMM Incorporated, San Diego, CA (US)

(72) Inventors: Wei Yang, San Diego, CA (US); Yi Huang, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/094,689

(22) Filed: Nov. 10, 2020

(65) Prior Publication Data

US 2021/0143950 A1 May 13, 2021

Related U.S. Application Data

(60) Provisional application No. 62/934,474, filed on Nov. 12, 2019.

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0061* (2013.01); *H04L 27/233* (2013.01); *H04L 27/2605* (2013.01)

(58) Field of Classification Search
None
See application file for complete search history.

(56) References Cited

U.S. PATENT DOCUMENTS

| 7,839,308 B2 | 11/2010 | Kim et al. |
| 2010/0220672 A1* | 9/2010 | Zhang ................. H04J 13/16 370/329 |

(Continued)

FOREIGN PATENT DOCUMENTS

| CN | 101110805 A | 1/2008 |
| CN | 114844606 A | 8/2022 |

(Continued)

OTHER PUBLICATIONS

International Search Report and Written Opinion—PCT/US2020/060029—ISA/EPO—dated Jul. 28, 2021.

(Continued)

*Primary Examiner* — Rebecca E Song
(74) *Attorney, Agent, or Firm* — Arent Fox Schiff LLP

(57) ABSTRACT

A non-coherent communication system in which a transmitting device does not transmit a pilot/DMRS, such that the receiving device may be configured to determine or decode the information received from the transmitting device without performing any channel estimation. An apparatus for wireless communication at a receiving device receives, from a transmitting device, a non-coherent signal having data. The apparatus may determine data from the received signal without performing a channel estimation. In another aspect, an apparatus at a transmitting device divides an information payload including a set of bits into multiple subsets of bits, maps each of the multiple subsets of bits into a respective sequence of complex symbols, generates a non-coherent transmission signal based on the respective sequences, and transmits the non-coherent transmission signal to a receiving device.

26 Claims, 15 Drawing Sheets

(51) Int. Cl.
*H04L 27/233* (2006.01)
*H04L 27/26* (2006.01)

(56) References Cited

U.S. PATENT DOCUMENTS

| | | | |
|---|---|---|---|
| 2011/0122846 A1* | 5/2011 | Yu | H04J 13/16 |
| | | | 370/335 |
| 2014/0093008 A1 | 4/2014 | Jong et al. | |
| 2018/0048372 A1 | 2/2018 | Sun et al. | |
| 2018/0159707 A1* | 6/2018 | Onggosanusi | H04L 27/2601 |
| 2019/0104009 A1* | 4/2019 | Fan | H04L 27/2678 |
| 2021/0050956 A1* | 2/2021 | Yeo | H04L 1/0057 |
| 2022/0006683 A1* | 1/2022 | Qin | H04L 27/361 |

FOREIGN PATENT DOCUMENTS

| | | | | |
|---|---|---|---|---|
| WO | 2008098221 | | 8/2008 | |
| WO | WO-2016078303 A1 * | | 5/2016 | H04B 7/06 |
| WO | WO-2020187054 A1 * | | 9/2020 | H04L 1/0002 |

OTHER PUBLICATIONS

Miller S.L., et al., "Code Division Multiplexing—Efficient Modulation for High Data Rate Transmission Over Wireless Channels," ICC 2000, 2000 IEEE International Conference on Communications, Conference Record, New Orleans, LA, Jun. 18-21, 2000, [IEEE International Conference on Communications], New York, NY: IEEE, US, vol. 3, Jun. 18, 2000 (Jun. 18, 2000), pp. 1487-1491, XP001208660, ISBN: 978-0-7803-6284-0, section II, figure 1.

Tong J., et al., "Iterative Decoding of Superposition Coding", 4th International Symposium on Turbo Codes & Related Topics, 6th International ITG-Conference on Source and Channel Coding, [Online] Apr. 3, 2006 (Apr. 3, 2006), XP055818399, 6 pages, Munich Germany, Retrieved from the Internet: URL: https://ieeexplore.ieee.org/stampPDF/getPDF.jsp?tp=&arnumber=5755921&ref=aHROCHM6Ly9pZWVleHBsb3JlLmllZWUub3JnL2Fic3RyYWN0L2RvY3VtZW50LzU3NTU5MjE= [retrieved on Jun. 28, 2021], figure 1 section 2.1.

Zhang R., et al., "A Unified Treatment of Superposition Coding Aided Communications: Theory and Practice", IEEE Communications Surveys and Tutorials, Institute of Electrical and Electronics Engineers, US, vol. 13, No. 3, Jul. 1, 2011 (Jul. 1, 2011), pp. 503-520, XP011353714, ISSN: 1553-877X, DOI: 10.1109/SURV.2011.061610.00102 section II-A, C.

Jalloul L.M.A., et al., "Performance Analysis of DS/CDMA with Noncoherent M-ary Orthogonal Modulation in Multipath Fading Channels", IEEE Journal on Selected Areas in Communications, IEEE Service Center, Piscataway, US, vol. 12, No. 2, Jun. 5, 1994 (Jun. 5, 1994), pp. 862-870, XP000464971, ISSN: 0733-8716, DOI: 10.1109/49.298060, figure 1, Section II.

Naguib A.F., et al., "Performance of Wireless Coma with M-ary Orthogonal Modulation and Cell Site Antenna Arrays", IEEE Journal on Selected Areas in Communications, IEEE Service Center, Piscataway, US, vol. 14, No. 9, Dec. 1, 1996 (Dec. 1, 1996), pp. 1770-1783, XP000639640, ISSN: 0733-8716, DOI: 10.1109/49.545700, Figure 1, Section II.

Partial International Search Report—PCT/US2020/060029—ISA/EPO—dated Feb. 2, 2021.

\* cited by examiner

FIG. 4 - PRIOR ART -

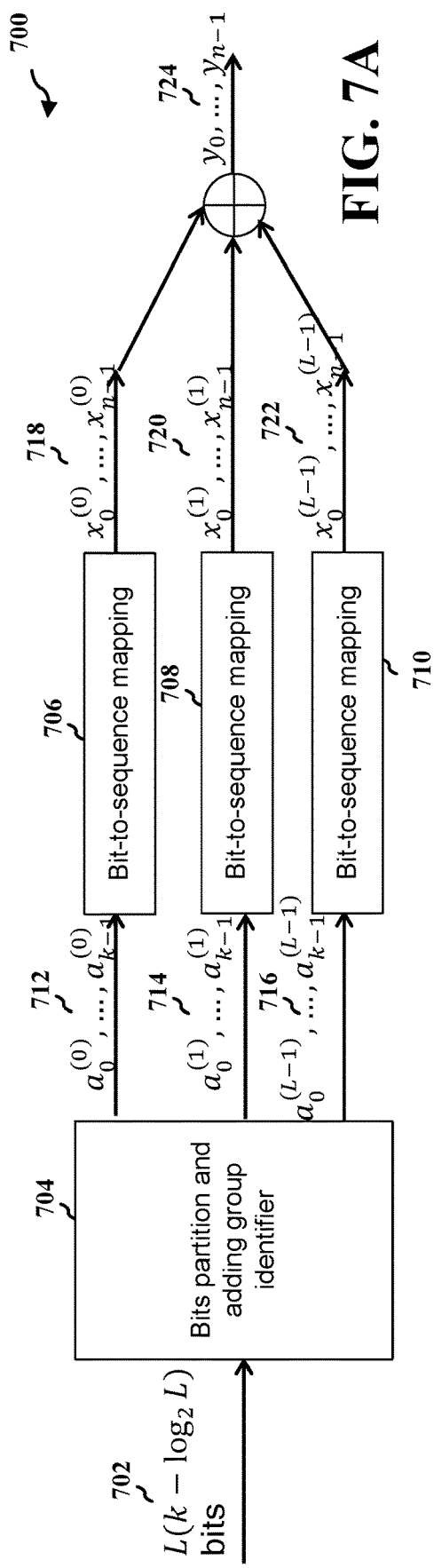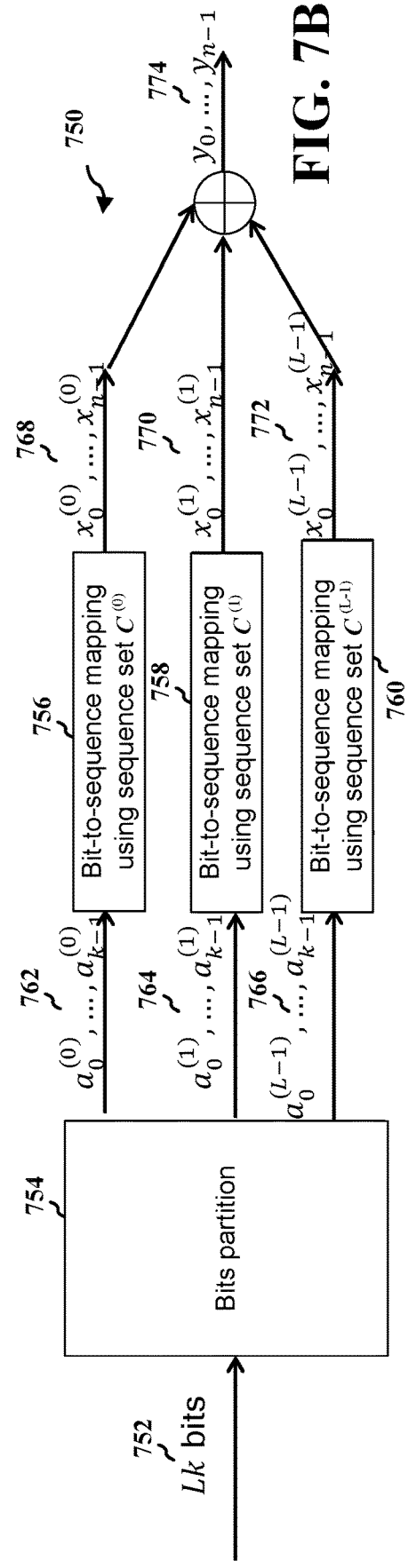

ARCHITECTURE FOR NON-COHERENT COMMUNICATION IN WIRELESS NETWORKS

CROSS-REFERENCE TO RELATED APPLICATION

This application claims the benefit of U.S. Provisional Application Ser. No. 62/934,474, entitled "ARCHITECTURE FOR NON-COHERENT COMMUNICATION" and filed on Nov. 12, 2019, the contents of which are expressly incorporated by reference herein in their entirety.

BACKGROUND

Technical Field

The present disclosure relates generally to communication systems, and more particularly, to non-coherent wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a wireless systems based on coherent communication, a transmitter transmits pilot symbols or a demodulation reference signal (DMRS) along with data. The data carries the information that the transmitter want to send to the receiver, while the pilot symbols or DMRS does not transmit information, but is used by the receiver to perform channel estimation. The receiver uses the pilot symbols or DMRS to estimate the channel and then sends the channel estimation information to the demodulator/decoder in order to perform coherent demodulation and coherent decoding.

Coherent communication systems may not perform optimally at low signal to noise ratio (SNR). For example, at low SNR, in order for the receiver to estimate the channel properly a lot of energy needs to be used to transmit the pilot symbols or DMRS, and the pilot/DMRS does not convey any useful information, such that the energy expended to transmit the pilot will not be used to send any useful information. In addition, the quality of channel estimation may be low at low SNR. If the receiver is unable to estimate the channel accurately, then the demodulation and coding will suffer, which may lead to a dramatic performance loss.

A UE at a cell edge may be operating at low SNR, and the coherent communication scheme utilizing the pilot/DMRS may not work effectively for such cell edge UEs. In order to overcome the issue or improve the performance, for example at low SNR, the present disclosure provides a non-coherent communication system.

In a coherent communication system, the receiver performs the demodulation and decoding in a coherent manner, where the receiver estimates the channel of the received signal based on the pilot/DMRS. In a non-coherent communication system, the transmitter does not transmit any pilot/DMRS, but instead will transmit the information directly to the receiver. The receiver will then determine or decode the information received from the transmitter without performing any channel estimation. Although the receiver does not perform any channel estimation explicitly, after the receiver demodulates or decodes the information the channel estimate may be a by-product of the receiving algorithm, meaning that after the receiver decodes and demodulates the signal, the receiver may obtain the estimate of the channel coefficient.

In an aspect of the disclosure, a method, a computer-readable medium, and an apparatus are provided. An example apparatus for wireless communication at a transmitting device divides an information payload including a set of bits into multiple subsets of bits. The example apparatus maps each of the multiple subsets of bits into a respective sequence of complex symbols. The example apparatus generates a non-coherent transmission signal based on the respective sequences. The example apparatus transmits the non-coherent transmission signal to a receiving device.

In another aspect of the disclosure, a method, a computer-readable medium, and an apparatus are provided. An example apparatus for wireless communication at a receiving device receives, from a transmitting device, a non-coherent signal having data. The example apparatus determines data from the received signal without performing a channel estimation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7A is a diagram illustrating another example of the transmitter architecture for a non-coherent communication system in accordance with certain aspects of the disclosure.

FIG. 7B is a diagram illustrating another example of the transmitter architecture for a non-coherent communication system in accordance with certain aspects of the disclosure.

DETAILED DESCRIPTION

Figure 1:
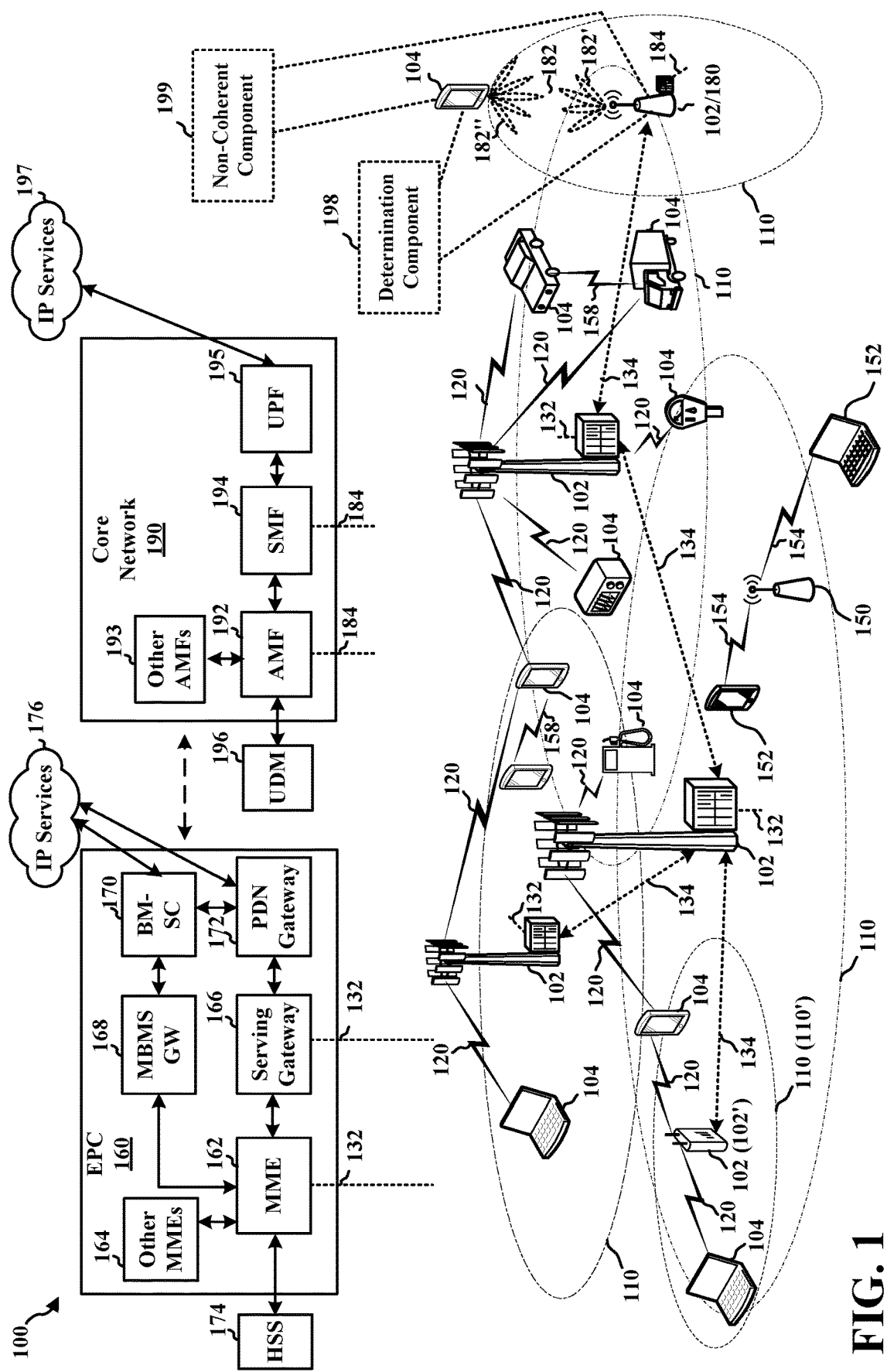
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104 or the base station 102, 180, may be configured to determine data from a signal without performing channel estimation. For example, the UE 104 or the base station 102/180 of FIG. 1 may include a determination component 198 configured to determine data from a received signal without performing a channel estimation. In some examples, the receiving device (e.g., UE 104 or base station 102, 180) may receive, from a transmitting device, a non-coherent signal having data. Then, the receiving device may determine, e.g., using the determination component 198, data from the received signal without performing the channel estimation.

Referring again to FIG. 1, in certain aspects, a transmitting device, such as a UE 104 or the base station 102, 180, may be configured to generate a non-coherent transmission signal. For example, the UE 104 or the base station 102/180 of FIG. 1 may include a non-coherent component 199 configured to generate a non-coherent transmission signal. In some example, the transmitting device (e.g., UE 104 or base station 102, 180) may generate, e.g., using the non-coherent component 199, a non-coherent transmission signal including mapping a subset of bits into a sequence of complex symbols. Then, the transmitting device may transmit the non-coherent transmission signal to a receiving device.

Although the following description may be focused on 5G NR, the concepts described herein may be applicable to other similar areas, such as LTE, LTE-A, CDMA, GSM, and other wireless technologies.

Figure 2:
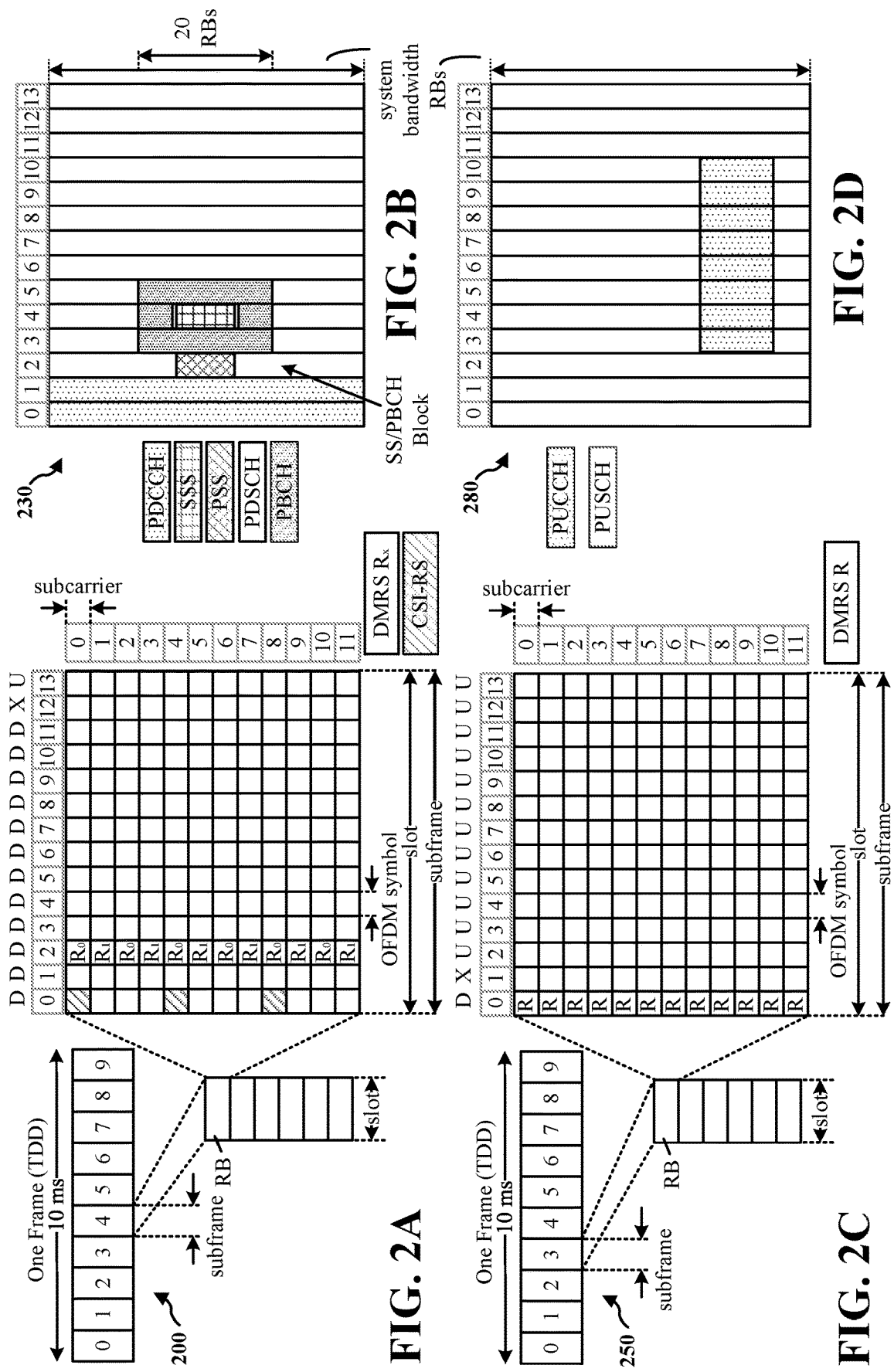
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
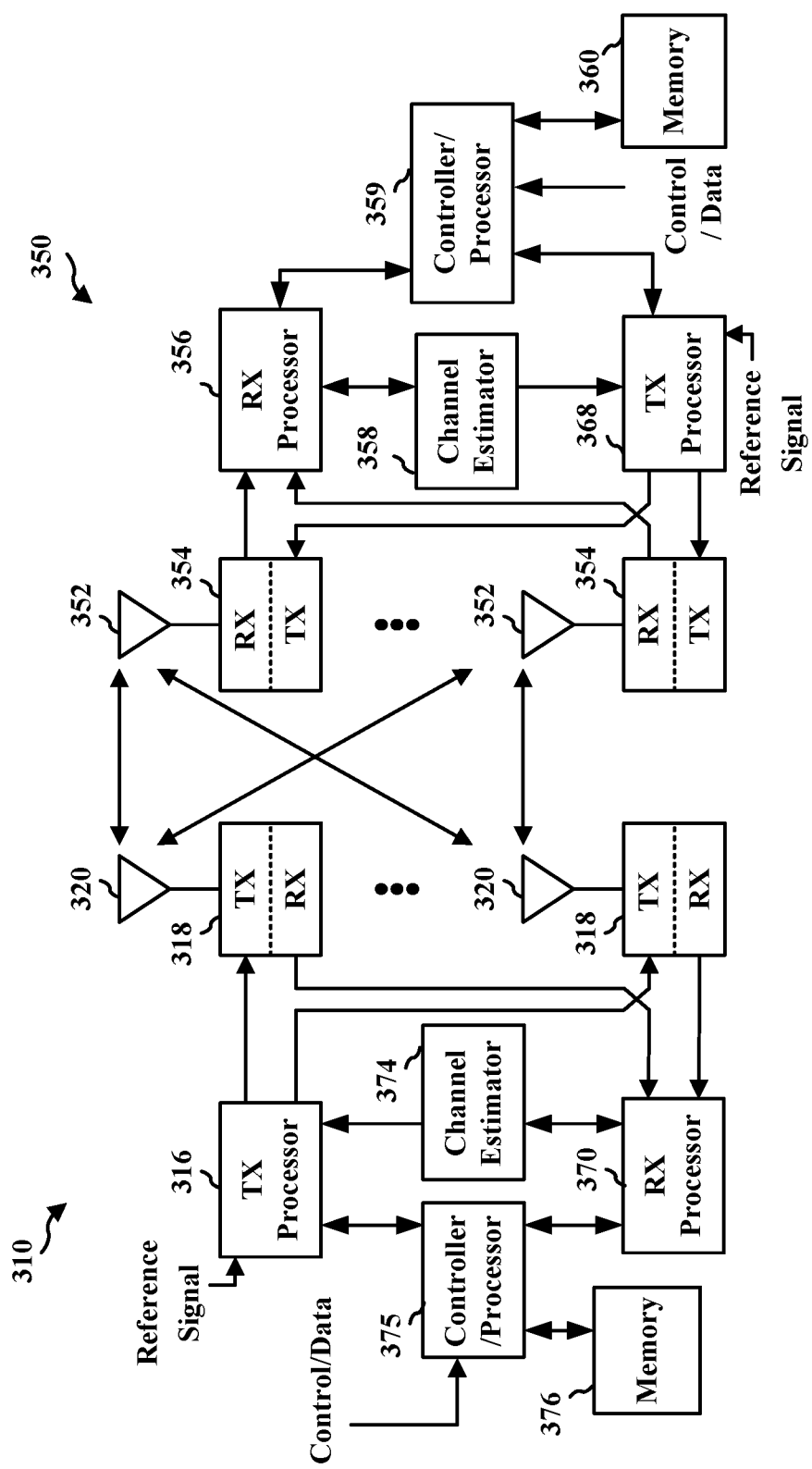
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 199 of FIG. 1.

At least one of the TX processor 316, the RX processor 370, and the controller/processor 375 may be configured to perform aspects in connection with 198 or 199 of FIG. 1.

Figure 4:
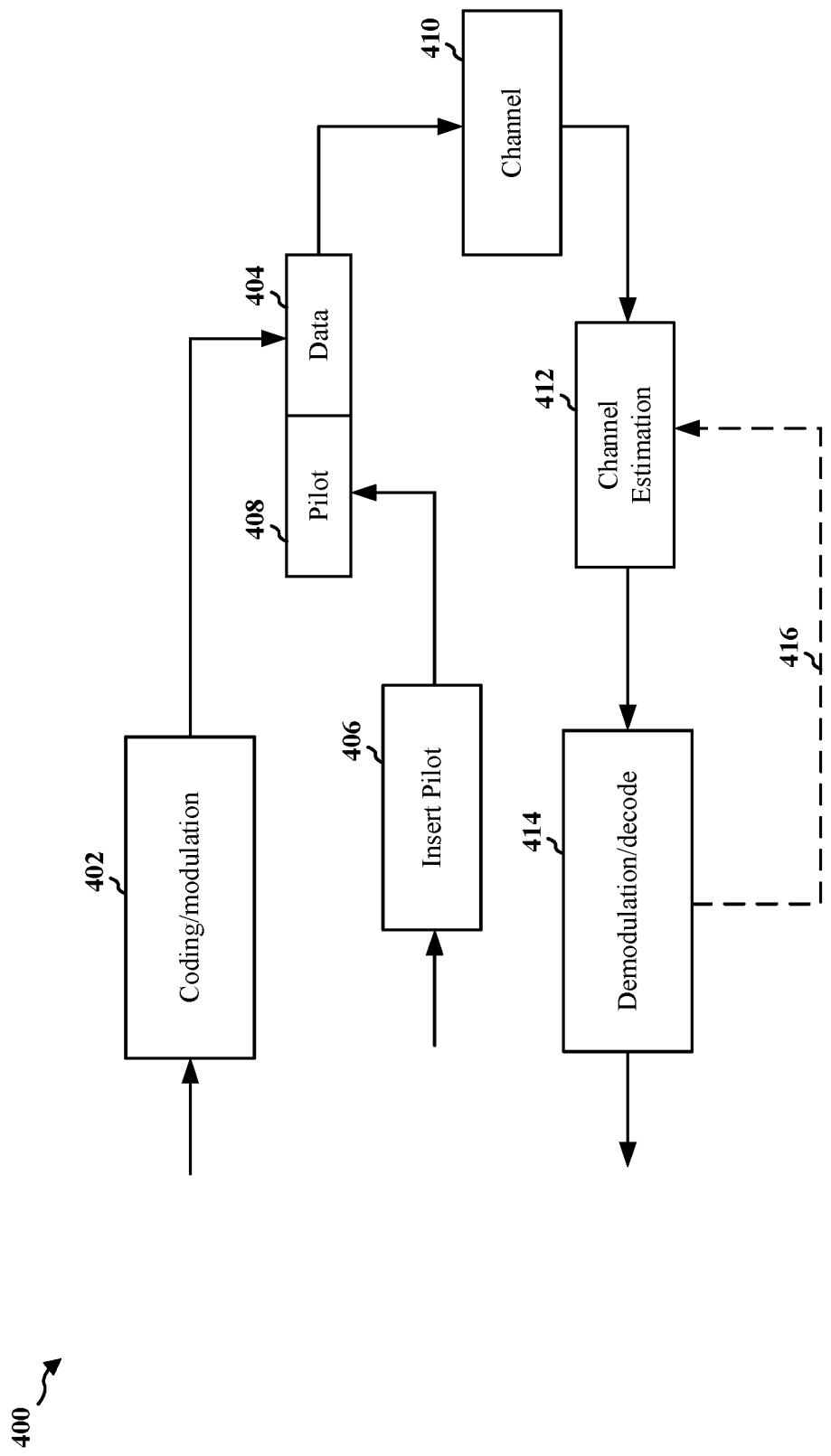
FIG. 4 is a diagram illustrating an example of a coherent communication system.

FIG. 4 is a diagram 400 illustrating an example of a coherent communication system. In wireless systems based on coherent communication, a transmitter generates a signal by coding and modulating 402 the signal and transmits data 404 and pilot symbols 408 or a demodulation reference signal (DMRS) along with data. The pilot symbols 408 may be inserted with the data 404 by an insert pilot 406. The data 404 carries the information that the transmitter wants to send to the receiver, while the pilot symbols or DMRS 408 does not transmit information, but is used by the receiver to perform channel estimation. The receiver uses the pilot symbols or DMRS 408 to estimate the channel 410 and then sends the channel estimation information 412 to the demodulator/decoder 414 in order to perform coherent demodulation and coherent decoding.

Coherent communication systems may not perform optimally at low SNR. For example, at low SNR, in order for the receiver to estimate the channel properly a lot of energy needs to be used to transmit the pilot symbols or DMRS, and since the pilot/DMRS does not convey any useful information, the energy consumed to transmit the pilot will not be used to convey any useful information. This may result in a loss of energy per bit. In addition, the quality of channel estimation may be low at low SNR. If the receiver is unable to estimate the channel accurately, then the demodulation and decoding will suffer, which may lead to a dramatic performance loss.

A UE at a cell edge may be operating at low SNR, and the coherent communication scheme utilizing the pilot/DMRS may not work effectively for such cell edge UEs. In order to overcome the issue and to improve the performance, for example at low SNR, the present disclosure provides a non-coherent communication system.

Figure 5:
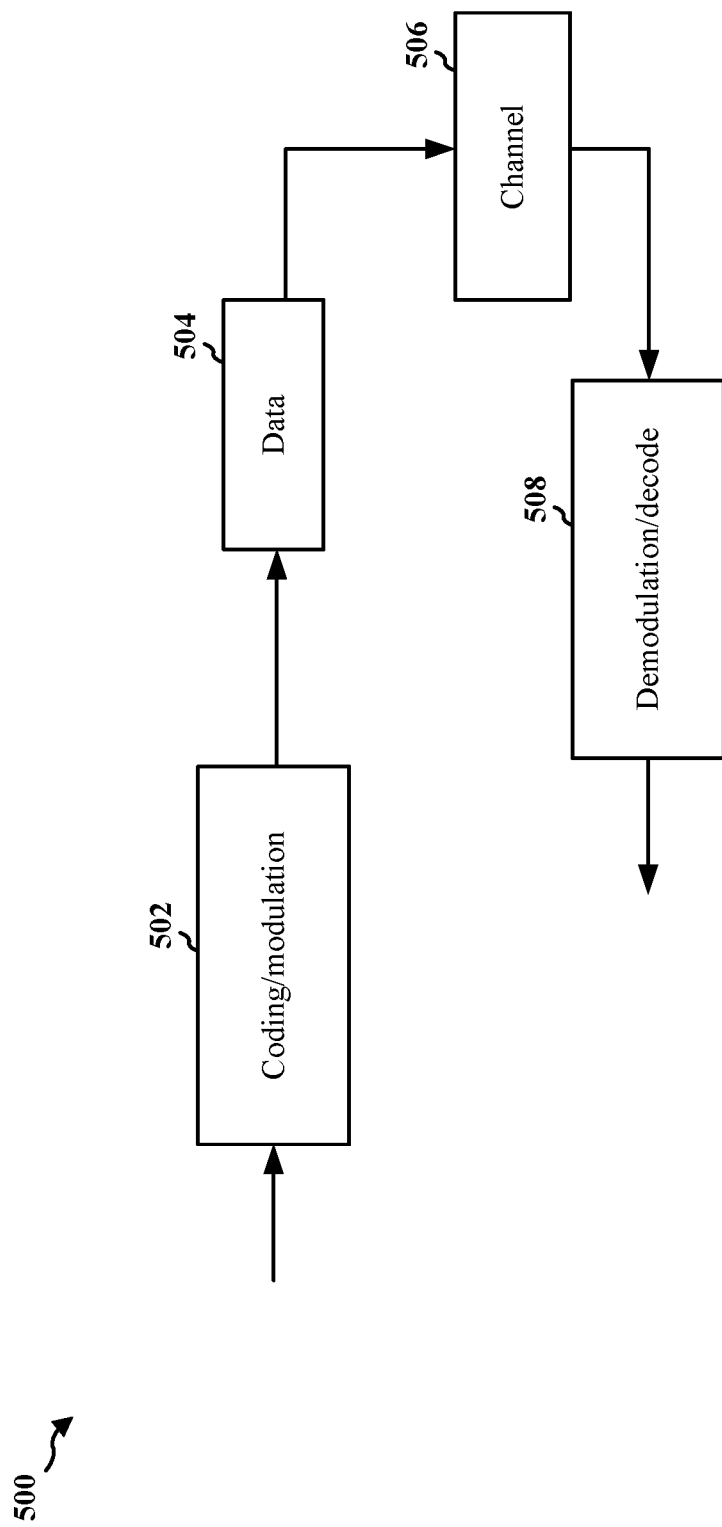
FIG. 5 is a diagram illustrating an example of a non-coherent communication system in accordance with certain aspects of the disclosure.

In a coherent communication system, the receiver may be configured to perform the demodulation and decoding in a coherent manner, where the receiver estimates the channel of the received signal based on the pilot/DMRS. In a non-coherent communication system the transmitter does not transmit any pilot/DMRS, but instead will transmit the information directly to the receiver. FIG. 5 is a diagram 500 illustrating an example of a non-coherent communication system. The transmitter will generate a non-coherent transmission signal by performing the coding/modulation 502 and then transmit the data 504 to the receiver. The receiver will then determine or decode the information received from the transmitter at demodulation/decode 508 without performing a channel estimation procedure. Although the receiver does not explicitly perform a channel estimation, after the receiver demodulates or decodes 508 the information, the channel estimate may be determined by channel 506 as a by-product of the receiving algorithm, meaning that after the receiver decodes and demodulates the signal the receiver may obtain the estimate of the channel coefficient.

Figure 6:
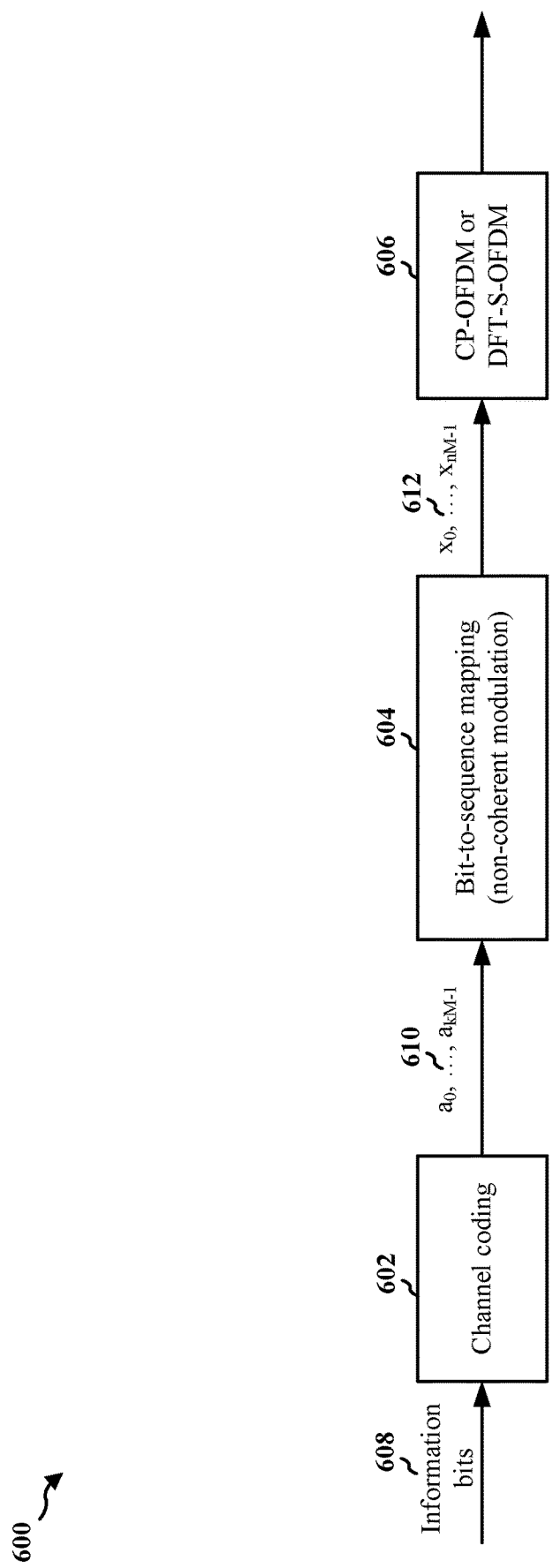
FIG. 6 is a diagram illustrating an example of a transmitter architecture for a non-coherent communication system in accordance with certain aspects of the disclosure.

FIG. 6 is a diagram 600 illustrating an example of a transmitter architecture for a non-coherent communication system. The diagram 600 of the transmitter architecture includes channel coding 602, bit-to-sequence mapping 604, and CP-OFDM or DFT-S-OFDM 606. On the transmitter side, the transmitter will first encode the information bits 608 at the channel coding block 602, into a coded bit stream 610. The channel coding block 602 may include adding an error detection code (e.g., a cyclic redundancy check (CRC)), channel coding using low density parity check (LDPC) code, Polar code, or other block codes, such as but not limited to Reed-Muller code or the like, interleaving, and/or rate matching. The adding of the error detection, channel coding, interleaving and/or rate matching may be collectively referred as the channel coding block 602 which may be configured to convert uncoded information bits into coded bits prior to modulation as channel coding. In some aspects, the channel coding block 602 may not be utilized if the payload size (e.g., the number of information bits) is very small (e.g., 20 bits, 40 bits, 48 bits, or the like). In such aspects, the transmitting device may be configured to directly map the information bits into sequences. The transmitter may also be configured to concatenate and/or superposition the sequences to generate the non-coherent signal (e.g., as discussed below). In the aspect disclosed herein, the listing of very small payload sizes is provided as an example, and the disclosure is not intended to be limited to such examples of payload sizes. Other payload sizes greater than or less than the provided examples may allow for the channel coding block 602 not being utilized, such that the transmitting device may directly map the information bits into sequences.

The transmitter will then map a subset of the sequence of bits into sequences 612 at the bit-to-sequence mapping block 604. The non-coherent sequence mapping may map each subset of k coded bits into a sequence of n complex symbols. For example, if the number of coded bits is kM, then the transmitter may partition the coded bits into M groups with k bits in each group. The transmitter may then map each group of k bits into a sequence of length n. In some aspects, the sequences may be selected from a set C of sequences of cardinality $2^k$. The transmitter may then concatenate the sequences together to form a transmit signal 612 of length nM, which is distinct in view of conventional modulation (e.g., as used in LTE or NR) in which each tuple of coded bits may be mapped to a single complex symbol (e.g., 2 bits in QPSK, 4 bits in 16 QAM, 6 bits in 64 QAM, etc.). For example, in FIG. 6, a set of k bits $a_0, \ldots, a_{k-1}$, after channel coding are mapped to bits $x_0, \ldots x_{n-1}$ of a sequence of length n. Another set of k bits $a_k, \ldots, a_{2k-1}$, after channel coding are mapped to $x_n, \ldots x_{2n-1}$. Then, the sequences are concatenated to form a concatenated sequence $x_0, \ldots x_{nM-1}$.

In some aspects, the bit-to-sequence mapping 604 may be configured to map groups into two sequences based on a comparison between the groups. For example, in instances where two k-bits groups differ in fewer bits, then the bit-to-sequence mapping 604 may map the two k-bits into two sequences with larger cross-correlation, e.g., (0, 0, 0, 0) in comparison with (0, 0, 0, 1). In instances where two k-bits groups differ in more bits, then the bit-to-sequence mapping 604 may map the two k-bit groups into two sequences with smaller cross-correlation, e.g., (0, 0, 0, 0) in comparison with (1, 1, 1, 1).

The channel coding block 602 may be configured to contain all the coding-related procedures, such as but not limited to, CRC insertion, channel coding, rate-matching, interleaving, and/or scrambling. $C^{(0)}$ FIG. 7A is a diagram 700 illustrating an example of a transmitter architecture for a non-coherent communication system. In some aspects, in order to support a larger payload size, the transmitting device may be configured to superposition multiple sequences together. For example, the transmitting device takes as input the $L(k-\log_2 L)$ bits, where L is a positive integer (e.g., a power of 2), and divides or partitions the bits, at block 704, into L groups where each group is comprised of $k-\log_2 L$ bits. In some aspects, the bits of the L groups may include coded bits or uncoded bits (e.g., informational bits). The transmitting device, in some aspects, for a group of $i \in \{0, \ldots, L-1\}$, may add a group identifier to each group of bits to form L bit stings of length k. For example, the transmitting device may add a prefix or suffix, at block 704, of $\log_2 L$ bits to the group of bits to form a k bit string $a^{(i)}$ (e.g., 712, 714, 716). The transmitting device may be configured to add the group identifier to the group of bits and is not intended to be limited to the aspects disclosed herein. The transmitting device may map (e.g., at 706, 708, 710) each bit string $a^{(i)}$ (e.g., 712, 714, 716) to a length-n sequence $x^{(i)}$ (e.g., 718, 720, 722). The transmitting device may then super-position the L sequences to generate one length-n sequence $y_l$ 724, based as follows:

$$y_l = \sum_{i \in (0, \ldots, L-1)} x_l^{(i)}, l = 0, \ldots, n-1$$

FIG. 7B is a diagram 750 illustrating another example of a transmitter architecture for a non-coherent communication system. In some aspects, the transmitter device may be configured to map the different groups of bits into sequences using different sets of sequences. For example, the block 754 may take as input Lk bits 752 and divide or partition the bits to form the k bit string $a^{(i)}$ (e.g., 762, 764, 766). However, block 754 does not add a group identifier to each group of bits, as discussed above in the example of FIG. 7A. Instead, the transmitting device may be configured to map the different groups of bits into sequences using different sets of sequences, respectively (e.g., at 756, 758, 760). The transmitting device may map (e.g., at 756, 758, 760) each bit string $a^{(i)}$ (e.g., 762, 764, 766) to a length-n sequence $x^{(i)}$ (e.g., 768, 770, 772). For example, a first group of bits $a_0^{(0)}, \ldots, a_{k-1}^{(0)}$ may be mapped to $x_0^{(0)}, \ldots, x_{n-1}^{(0)}$ using sequences from sequence set $C^{(0)}$. A second group of bits $a_0^{(2)}, \ldots a_{k-1}^{(2)}$ may be mapped to $x_0^{(2)}, \ldots, x_{n-1}^{(2)}$ using sequences from sequence set $C^{(2)}$. An Lth group of bits $a_0^{(L-1)}, \ldots, a_{k-1}^{(L-1)}$ may be mapped to $x_0^{(L-1)}, \ldots, x_{n-1}^{(L-1)}$ using sequences from sequence set $C^{(L-1)}$. In such aspects, the group identifier may be implicitly conveyed through the sequence set. The transmitting device may then super-position the L sequences to generate one length-n sequence $y_l$ 774 in a manner similar to the sequence $y_l$ 724, discussed above.

Figure 8:
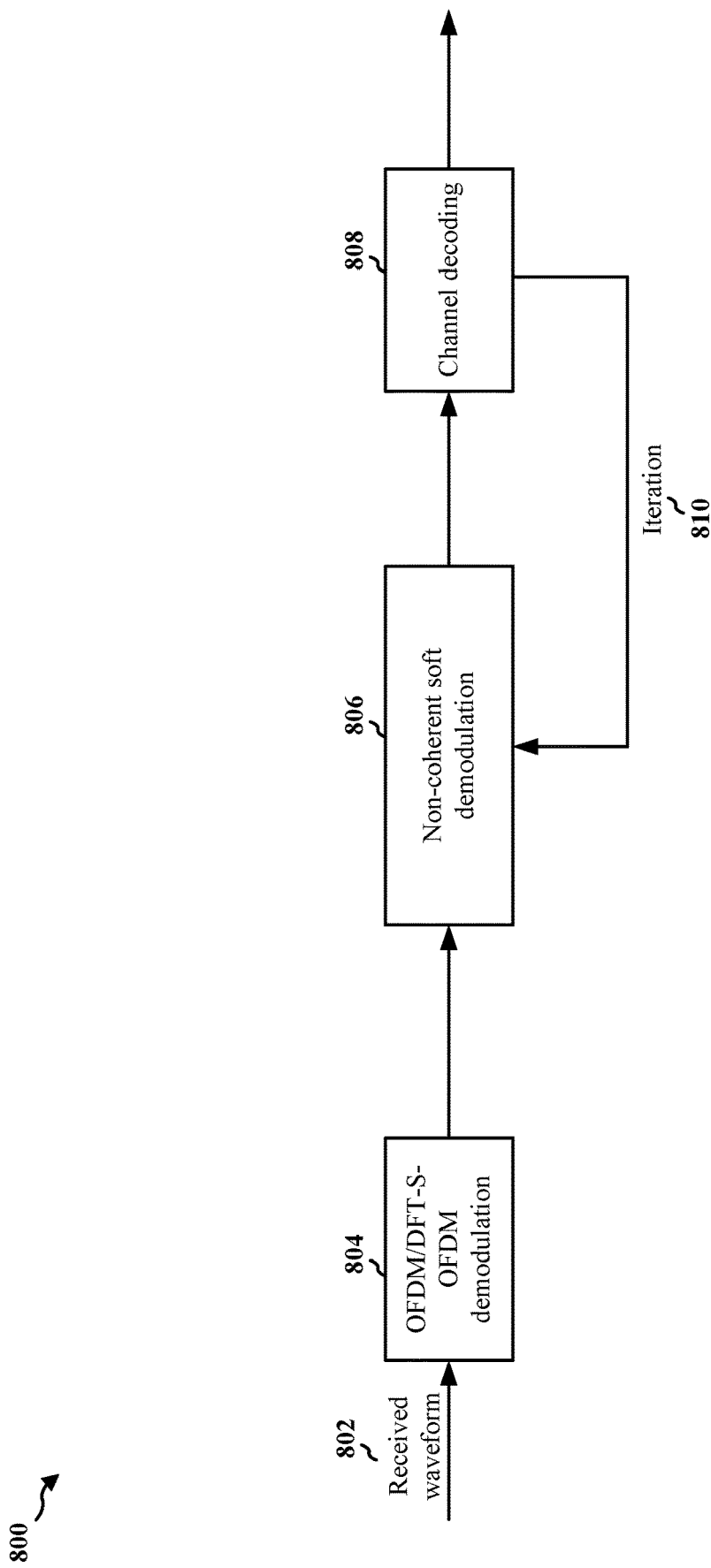
FIG. 8 is a diagram illustrating an example of a receiver architecture for a non-coherent communication system in accordance with certain aspects of the disclosure.

FIG. 8 is a diagram 800 illustrating an example of a receiver architecture for a non-coherent communication system. The diagram 800 of the receiver architecture includes an OFDM/DFT-S-OFDM demodulation block 804, a non-coherent soft demodulation block 806, and a channel decoding block 808. For each signal $y \in C^n$ received on each receive antenna, the receiving device may first partition the received signals into M sub-groups of length n. Each group of received signals may correspond to one sequence. In some aspects, each group of received signals may correspond to L super-positioned sequences. In some aspects, for example when super-positioning does not occur, the receiver may determine a score $s_j$ for each candidate sequence in the set C of $2^k$ sequences. The score $s_j$ for a candidate sequence $c_j$ may be based on a cross-correlation between the received signal y and the candidate sequence $c_j$. The receiving device, using the scores $s_j$, may determine a log-likelihood ratio (LLR) for each of the k bits. In some aspects, the receiving device may compute the LLR of a particular bit as follows:

$$LLR(a_i) = 2^{1-k}(\Sigma_{j: \text{the } i \text{ th bit of } c_j \text{ is } 0} - \Sigma_{j: \text{the } i \text{ th bit of } c_j \text{ is } 1} s_j)$$

The j: the i-th bit of $c_j$ is 0 refers to the sum over all sequence with the index j, where the i-th bit of the sequence cj is equal to 0. For example, in an aspect where k=3 and i=0, then the sequences corresponding to the following bits are such that the i-th bit is zero, as shown below.

| |
|---|
| 000 |
| 001 |
| 010 |
| 011 |

In another example, where k=3 and i=1, then the sequences that correspond to the following bit strings have the i-th bit equal to 1, as shown below.

| |
|---|
| 100 |
| 101 |
| 110 |
| 111 |

Therefore, in this example, the LLR may be based on a difference between a sum of scores for a particular bit to have a value of 0 and the sum of scores for the particular bit to have a value or 1.

In some aspects, the receiving device may compute the LLR of a particular bit as follows:

$$LLR(a_i) = \max\{s_j: j: \text{the } i \text{ th bit of } c_j \text{ is } 0\} - \max\{s_j: j: \text{the } i \text{ th bit of } c_j \text{ is } 1\}$$

where $\max\{s_j: j: \text{the i th bit of } c_j \text{ is } 0\}$ represents where the score values $s_j$ of the i-th bit of $c_j$ is equal to 0, and then compute the maximum of all of the score values to determine the first term in the equation, and where $\max\{s_j: j: \text{the i th bit of } c_j \text{ is } 1\}$ represents where the score values $s_j$ of the i-th bit of $c_j$ is equal to 1, and then compute the minimum of all of the score values to determine the second term in the equation.

Therefore, in this example, the LLR may be based on a difference between a maximum score for a particular bit to have a value of 0 and a maximum score for the particular bit to have a value of 1.

Figure 9:
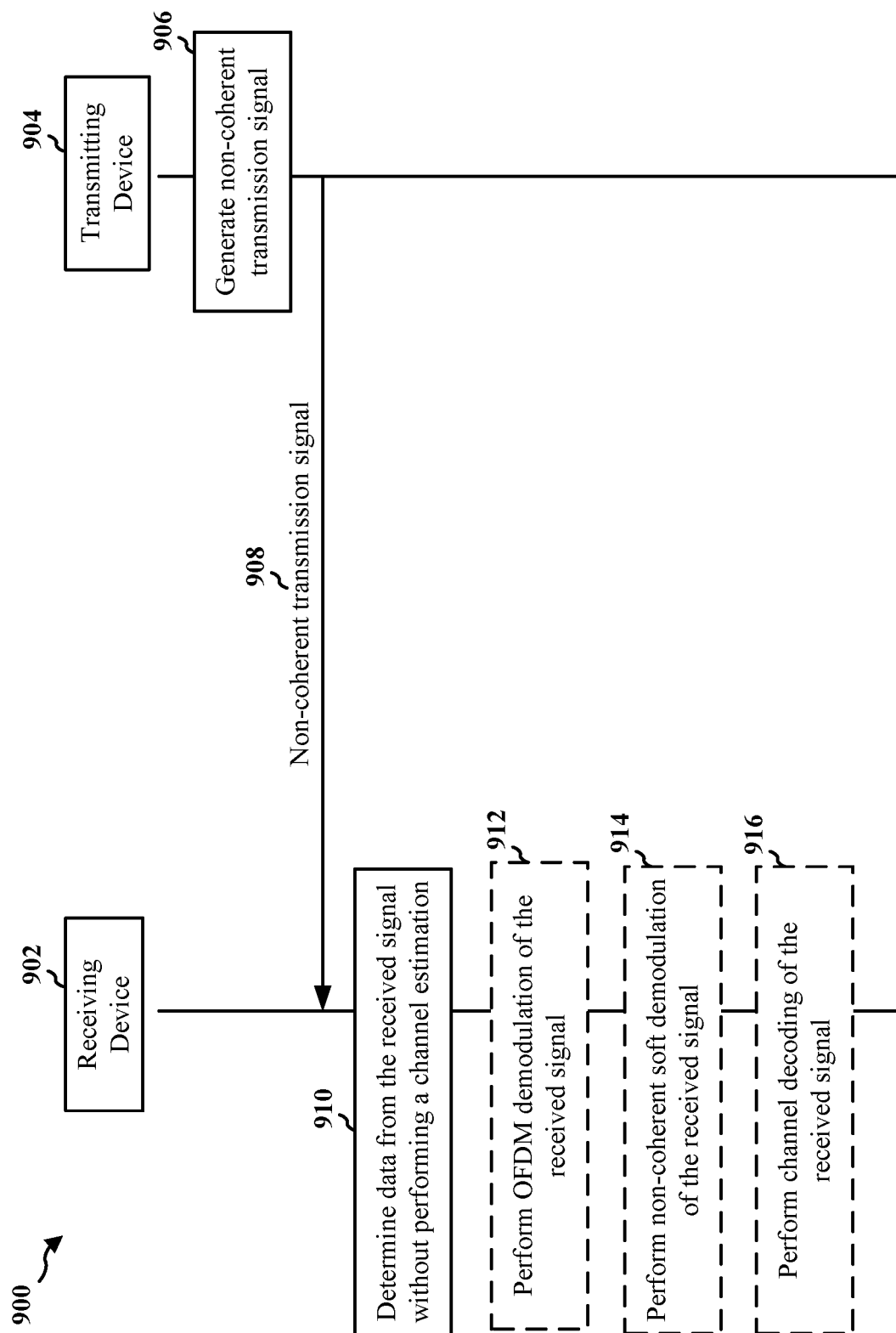
FIG. 9 is a call flow diagram of signaling between a receiving device and a transmitting device in accordance with certain aspects of the disclosure.

FIG. 9 illustrates an example communication flow 900 between a receiving device 902 and a transmitting device 904. The receiving device 902 may correspond to a UE, and the transmitting device 904 may correspond to a base station. For example, in the context of FIG. 1, the transmitting device 904 may correspond to base station 102/180 and, accordingly, the cell may include a geographic coverage area 110 in which communication coverage is provided and/or small cell 102' having a coverage area 110'. Further, the receiving device 902 may correspond to at least UE 104. In another example, in the context of FIG. 3, the transmitting device 904 may correspond to the base station 310 and the receiving device 902 may correspond to the UE 350. In yet other aspects, the receiving device 902 may correspond to a base station and the transmitting device 904 may correspond to a UE.

At 906, the transmitting device 904 may generate a non-coherent transmission signal including mapping a subset of bits into a sequence of complex symbols. In some aspects, the subset of bits may comprise a subset of coded bits. The coded bits may be generated from a LDPC code or a Polar code. In some aspects, to generate the non-coherent transmission signal, the transmitting device 904 may map one or more subset of coded bits into a respective sequence of complex symbols. Each group may be mapped into a respective sequence of a length n of a plurality of sequences. The plurality of sequences may be concatenated to form the non-coherent transmission signal. In some aspects, if two k bits group differ in fewer bits, then the two k bit groups may be mapped into two sequences having a larger cross-correlation. In some aspects, if two k bits group differ in more bits, then the two k bit groups may be mapped into two sequences having a smaller cross-correlation.

In some aspects, to generate the non-coherent transmission signal, the transmitting device 904 may add identification information to each of M groups of bits to form M bit strings. The subset of bits may be partitioned into groups. In some aspects, to add identification information, the transmitting device 904 may reserve one or more of the k bits to include the identification information. In some aspects, to add identification information, the transmitting device 904 may add a prefix or suffix comprising the identification information to each of the M groups of bits to form the M bit strings. In some aspects, to generate the non-coherent transmission signal, the transmitting device 904 may map each of the M bit strings to the respective sequence of the length n. In some aspects, to generate the non-coherent transmission signal, the transmitting device 904 may superposition each of the respective sequences of the length n to generate a super-positioned sequence of length n. The identification information may indicate an identity of each of the groups from the M groups that are involved in the superposition of the sequences.

Upon generation of the non-coherent transmission signal, the transmitting device 904 may transmit the non-coherent transmission signal 908 to a receiving device 902.

The receiving device 902 receives, from the transmitting device 904, the non-coherent transmission signal 908 having data.

At 910, the receiving device 902 may determine data from the received signal 908 without performing a channel estimation.

In some aspects, for example at 912, the receiving device 902 may perform an OFDM demodulation of the received signal. The receiving device 902 may perform the OFDM demodulation to determine the data from the received signal. In some aspects, the receiving device 902 may perform the OFDM demodulation prior to performing the non-coherent soft demodulation.

In some aspects, for example at 914, the receiving device 902 may perform a non-coherent soft demodulation of the received signal. The receiving device 902 may perform the non-coherent soft demodulation in order to determine the data from the received signal. In some aspects, the receiving device 902 may determine a log-likelihood ration (LLR) for each bit of the received signal. In some aspects, to perform the non-coherent soft demodulation, the receiving device 902 may partition the received signal into M subgroups of length n. Each group of the received signal may correspond to a candidate sequence. The receiving device 902 may determine a score $s_j$ for each candidate sequence, when performing the non-coherent soft demodulation. In some aspects, the LLR for a bit may be based on a first sum of scores for the bit being based on a first value minus a second sum for the bit being a second value. In some aspects, the LLR for a bit may be based on a first maximum score for the bit being based on a first value minus a second maximum score for the bit being a second value. In yet some aspects, the score may be based on a cross-correlation between the received signal and the candidate sequence.

In some aspects, for example at 916, the receiving device 902 may perform a channel decoding of the received signal. The receiving device 902 may perform the channel decoding to determine the data from the received signal. In some aspects, the receiving device 902 may perform the channel decoding after performing the non-coherent soft demodulation of the received signal. In some aspects, an output of the channel decoding may be submitted back to the non-coherent soft demodulation to perform an iterative demodulation and decoding procedure, as described in 808 of FIG. 8.

Figure 10:
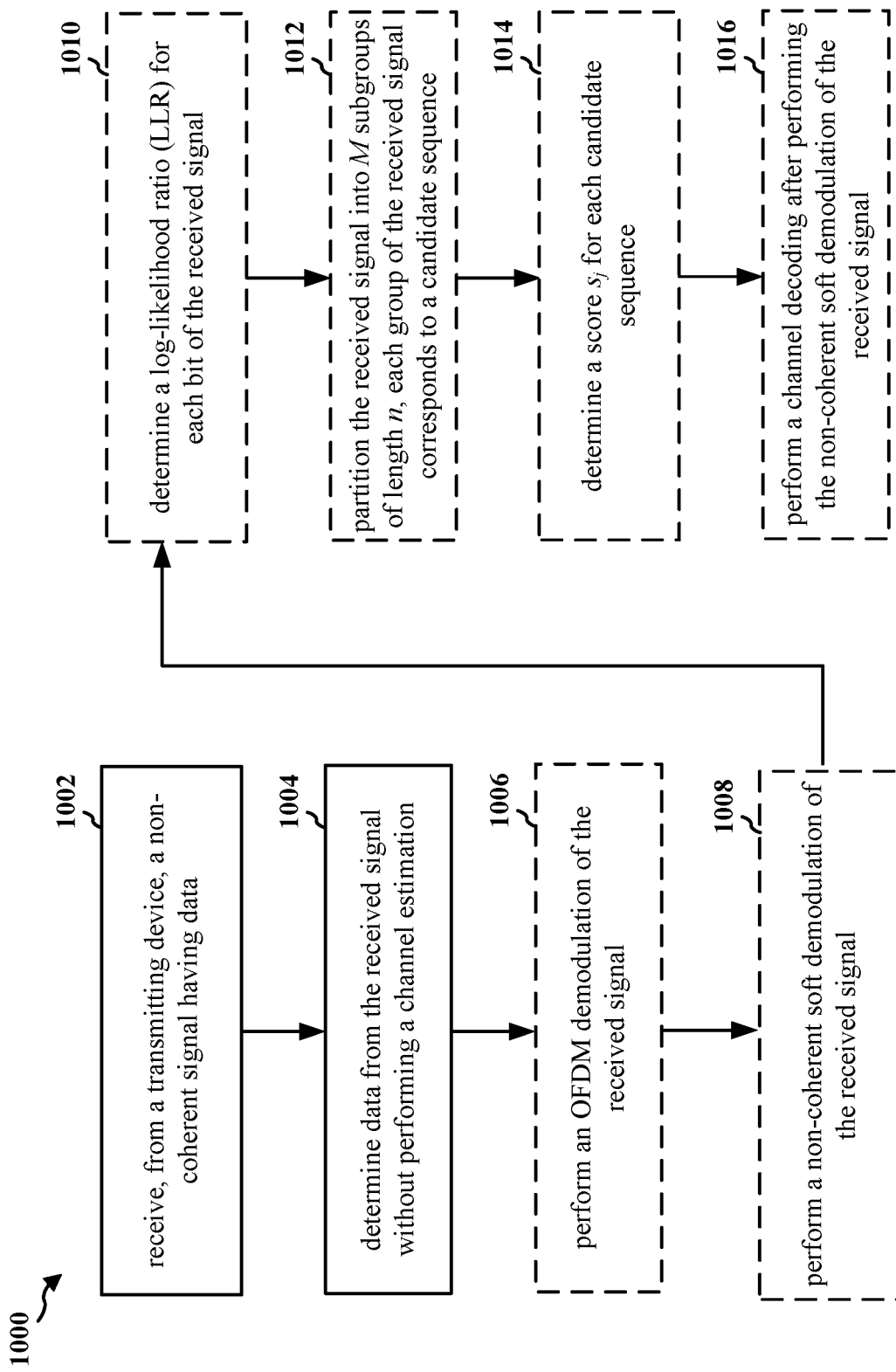
FIG. 10 is a flowchart of a method of wireless communication.

FIG. 10 is a flowchart 1000 of a method of wireless communication. The method may be performed by a receiving device (e.g., the receiving device 902; the apparatus 1102/1102'; the processing system 1214). The method may be performed by a transmitting device (e.g., the transmitting device 904; the apparatus 1402/1402'; the processing system 1514). In some aspects, the receiving device may comprise a UE or a component of the UE, such that the method may be performed by the UE or the component of a UE (e.g., the UE 104, 350; the apparatus 1102/1102'; the processing system 1214, which may include the memory 360 and which may be the entire UE 350 or a component of the UE 350, such as the TX processor 368, the RX processor 356, and/or the controller/processor 359). In some aspects, the receiving device may comprise a base station or a component of the base station, such that the method may be performed by the base station or a component of the base station (e.g., the base station 102, 180, 310; the apparatus 1402/1402'; the processing system 1214, which may include the memory 376 and which may be the entire base station 310 or a component of the base station 310, such as the TX processor 316, the RX processor 370, and/or the controller/processor 375). According to various aspects, one or more of the illustrated operations of method 1000 may be omitted, transposed, and/or contemporaneously performed. Optional aspects are illustrated with a dashed line. The method may allow a receiving device (e.g., UE or base station) to operate in a non-coherent communication scheme and determine the information from a received signal without performing channel estimation.

At 1002, the receiving device may receive a non-coherent signal having data. For example, 1002 may be performed by non-coherent component 1106 of apparatus 1102. The receiving device may receive the non-coherent signal from a transmitting device. In some aspects, the receiving device may be a UE and the transmitting device may be a base station. In some aspects, the receiving device may be a base station and the transmitting device may be a UE.

At 1004, the receiving device may determine data from the received signal without performing a channel estimation. For example, 1004 may be performed by determination component 1108 of apparatus 1102.

In some aspects, for example at 1006, the receiving device may perform an OFDM demodulation of the received signal. For example, 1006 may be performed by OFDM demodulation component 1110 of apparatus 1102. The receiving device may perform the OFDM demodulation of the received signal to determine the data from the received signal. In some aspects, the receiving device may perform the OFDM demodulation of the received signal prior to performing the non-coherent soft demodulation.

In some aspects, for example at 1008, the receiving device may perform a non-coherent soft demodulation of the received signal. For example, 1008 may be performed by soft demodulation component 1112 of apparatus 1102. The receiving device may perform the non-coherent soft demodulation of the received signal to determine the data from the received signal.

In some aspects, for example at 1010, the receiving device may determine a LLR for each bit of the received signal. For example, 1010 may be performed by LLR component 1114 of apparatus 1102. The receiving device may determine the LLR for each bit of the received signal to perform the non-coherent soft demodulation of the received signal.

In some aspects, for example at 1012, to perform the non-coherent soft demodulation, the receiving device may partition the received signal into M subgroups of length n. For example, 1012 may be performed by partition component 1116 of apparatus 1102. In some aspects, each group of the received signal may correspond to a candidate sequence.

In some aspects, for example at 1014, to perform the non-coherent soft demodulation, the receiving device may determine a score $s_j$ for each candidate sequence. For example, 1012 may be performed by score component 1118 of apparatus 1102. In some aspects, the LLR for a bit may be based on a first sum of scores for the bit being a first value minus a second sum for the bit being a second value. In some aspects, the LLR for a bit may be based on a first maximum score for the bit being a first value minus a second maximum score for the bit being a second value. In some aspects, the score may be based on a cross-correlation between the received signal and the candidate sequence.

In some aspects, for example at 1016, the receiving device may perform a channel decoding of the received signal. For example, 1016 may be performed by channel decoding component 1120 of apparatus 1102. In some aspects, the receiving device may perform the channel decoding after performing the non-coherent soft demodulation of the received signal. In some aspects, an output of the channel decoding may be submitted back to the non-coherent soft demodulation in order to perform an iterative demodulation and decoding procedure.

Figure 11:
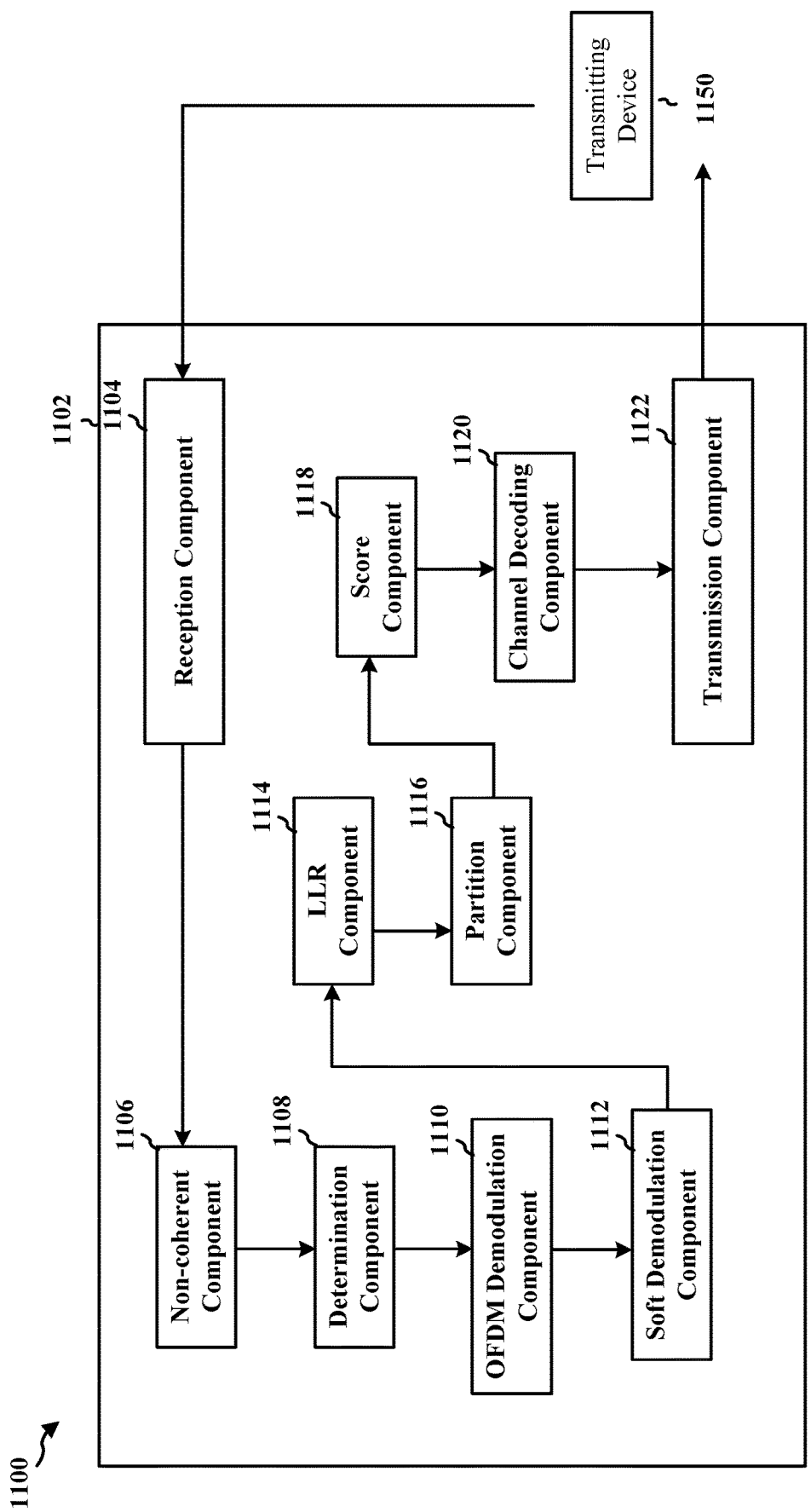
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a receiving device. In some aspects, the apparatus may comprise UE or a component of the UE. In some aspects, the apparatus may comprise a base station or a component of a base station. The apparatus includes a reception component 1104 that may be configured to receive various types of signals/messages and/or other information from other device, including, for example, the transmitting device 1150. The apparatus includes a non-coherent component 1106 that may receive a non-coherent signal having data, e.g., as described in connection with 1002 of FIG. 10. The apparatus includes a determination component 1108 that may determine data from the received signal without performing a channel estimation, e.g., as described in connection with 1004 of FIG. 10. The apparatus includes a soft demodulation component 1110 that may perform a non-coherent soft demodulation of the received signal, e.g., as described in connection with 1006 of FIG. 10. The apparatus includes an OFDM demodulation component 1112 that may perform an OFDM demodulation of the received signal, e.g., as described in connection with 1008 of FIG. 10. The apparatus includes an LLR component 1114 that may determine a LLR for each bit of the received signal, e.g., as described in connection with 1010 of FIG. 10. The apparatus includes a partition component 1116 that may partition the received signal into M subgroups of length n, e.g., as described in connection with 1012 of FIG. 10. The apparatus includes a score component 1118 that may determine a score $s_j$ for each candidate sequence, e.g., as described in connection with 1014 of FIG. 10. The apparatus includes a channel decoding component 1120 that may perform a channel decoding of the received signal, e.g., as described in connection with 1016 of FIG. 10. The apparatus includes a transmission component 1122 that may be configured to transmit various types of signals/messages and/or other information to other devices, including, for example, the transmitting device 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
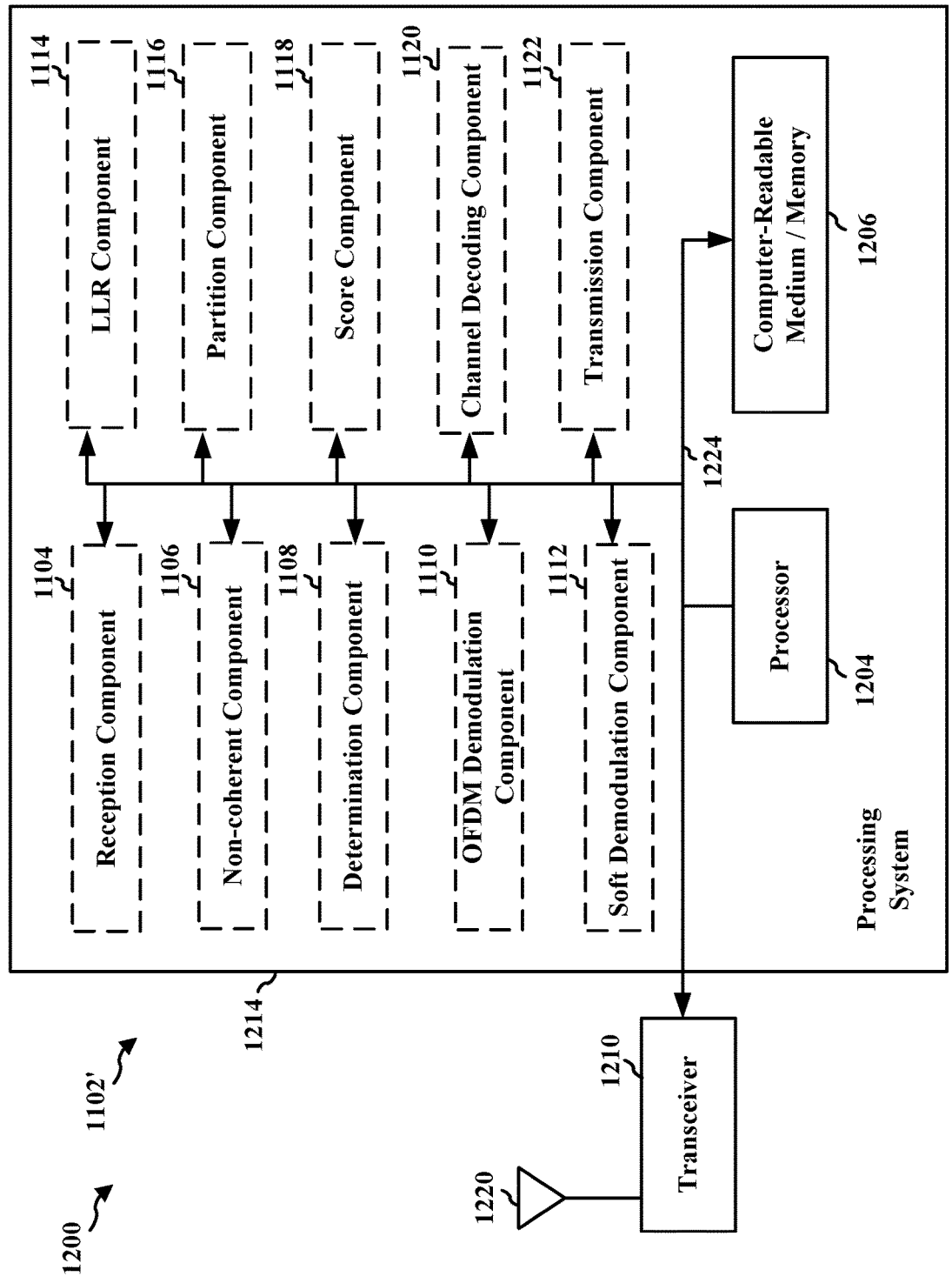
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1122, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3). The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for receiving, from a transmitting device, a non-coherent signal having data. The apparatus includes means for determining data from the received signal without performing a channel estimation. The means for determining data may be configured to perform a non-coherent soft demodulation of the received signal. The means for determining data may be configured to perform an OFDM demodulation of the received signal prior to performing the non-coherent soft demodulation. The means for determining data may be configured to perform a channel decoding after performing the non-coherent soft demodulation of the received signal. The means for determining data may be configured to determine a LLR for each bit of the received signal. The means for determining data may be configured to partition the received signal into M subgroups of length n. Each group of the received signal corresponds to a candidate sequence. The means for determining data may be configured to determine a score $s_j$ for each candidate sequence. The means for determining data may be configured to perform a channel decoding after performing the non-coherent soft demodulation of the received signal. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
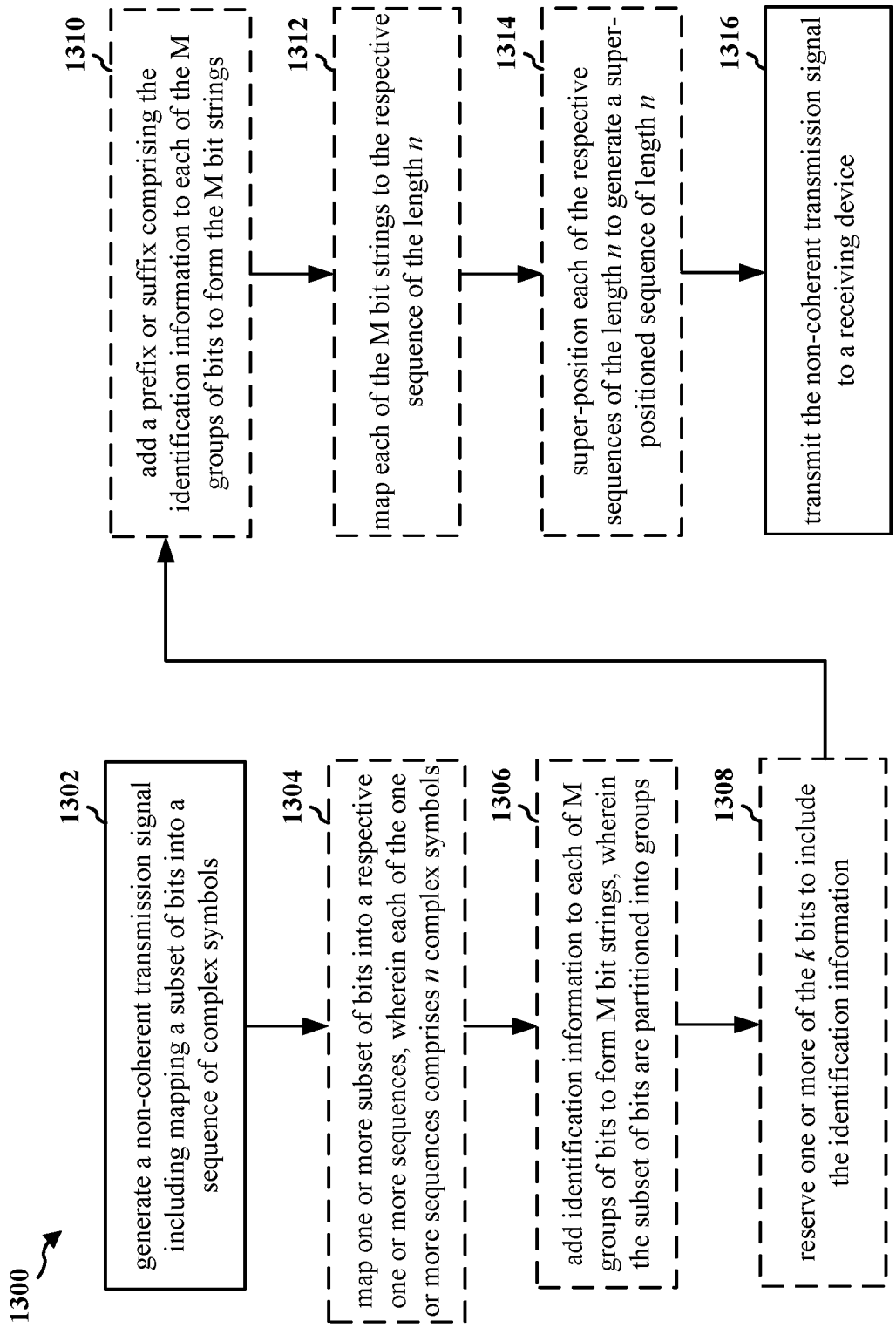
FIG. 13 is a flowchart of a method of wireless communication.

FIG. 13 is a flowchart 1300 of a method of wireless communication. The method may be performed by a transmitting device (e.g., the transmitting device 904; the apparatus 1402/1402'; the processing system 1514). The method may be performed by a receiving device (e.g., the transmitting device 904; the apparatus 1402/1402'; the processing system 1514). In some aspects, the transmitting device may comprise a UE or a component of the UE, such that the method may be performed by the UE or the component of a UE (e.g., the UE 104, 350; the apparatus 1102/1102'; the processing system 1214, which may include the memory 360 and which may be the entire UE 350 or a component of the UE 350, such as the TX processor 368, the RX processor 356, and/or the controller/processor 359). In some aspects, the transmitting device may comprise a base station or a component of the base station, such that the method may be performed by the base station or a component of the base station (e.g., the base station 102, 180, 310; the apparatus 1402/1402'; the processing system 1214, which may include the memory 376 and which may be the entire base station 310 or a component of the base station 310, such as the TX processor 316, the RX processor 370, and/or the controller/processor 375). According to various aspects, one or more of the illustrated operations of method 1300 may be omitted, transposed, and/or contemporaneously performed. Optional aspects are illustrated with a dashed line. The method may allow a transmitting device (e.g., base station or UE) to operate in a non-coherent communication scheme and transmit a transmission signal without transmitting any pilot signals or DMRS.

At 1302, the transmitting device may generate a non-coherent transmission signal. For example, 1302 may be performed by generation component 1406 of apparatus 1402. The transmitting device may include, in the non-coherent transmission signal, mapping a subset of bits into a sequence of complex symbols. In some aspects, the subset of bits may comprise a subset of coded bits. The coded bits may be generated from a LDPC code or a Polar code.

In some aspects, for example, at 1304, to generate the non-coherent transmission signal, the transmitting device may map one or more subset of bits into a respective one or more sequences of complex signals. For example, 1304 may be performed by map component 1408 of apparatus 1402. In some aspects, each of the one or more sequences comprises n complex symbols. In some aspects, each group may be mapped into a respective sequence of a length n of a plurality of sequences. In some aspects, the one or more sequences may be concatenated to form the non-coherent transmission signal. In some aspects, the mapping of the subset of bits into the sequence of complex symbols may determine if two k bits group differ in fewer bits, such that the two k bit groups may be mapped into two sequences having a larger cross-correlation. While in other aspects, the mapping of the subset of bits into the sequence of complex symbols may determine if two k bits group differ in more bits, such that the two k bit groups may be mapped into two sequences having a smaller cross correlation.

In some aspects, to generate the non-coherent transmission signal, the transmitting device may partition the one or more subset of bits into M groups of bits to form M bit strings. The transmitting device may map each of the M bit strings to the respective sequence based on a respective sequence set of the length n. The transmitting device may super-position each of the respective sequences of the length n to generate a super-positioned sequence of length n.

In some aspects, for example, at 1306, to generate the non-coherent transmission signal, the transmitting device may add identification information to each of M groups of bits to form M bit strings. For example, 1306 may be performed by identification component 1410 of apparatus 1402. In some aspects, the subset of bits may be partitioned into groups. The identification information may indicate an identity of each of the groups from the M groups involved in the super-position.

In some aspects, for example, at 1308, to add the identification information, the transmitting device may reserve one or more k bits to include the identification information. For example, 1308 may be performed by reservation component 1412 of apparatus 1402.

In some aspects, for example, at 1310, to add the identification information, the transmitting device may add a prefix or suffix comprising the identification information to each of the M groups of bits to form the M bit strings. For example, 1310 may be performed by add component 1414 of apparatus 1402.

In some aspects, for example at 1312, to generate the non-coherent transmission signal, the transmitting device may map each of the M bit strings to the respective sequence of the length n. For example, 1312 may be performed by sequence component 1416 of apparatus 1402.

In some aspects, for example at 1314, to generate the non-coherent transmission signal, the transmitting device may super-position each of the respective sequences of the length n to generate a super-positioned sequence of length n. For example, 1314 may be performed by super-position component 1418 of apparatus 1402.

At 1316 the transmitting device may transmit the non-coherent transmission signal to a receiving device. For example, 1316 may be performed by non-coherent component 1420 of apparatus 1402.

Figure 14:
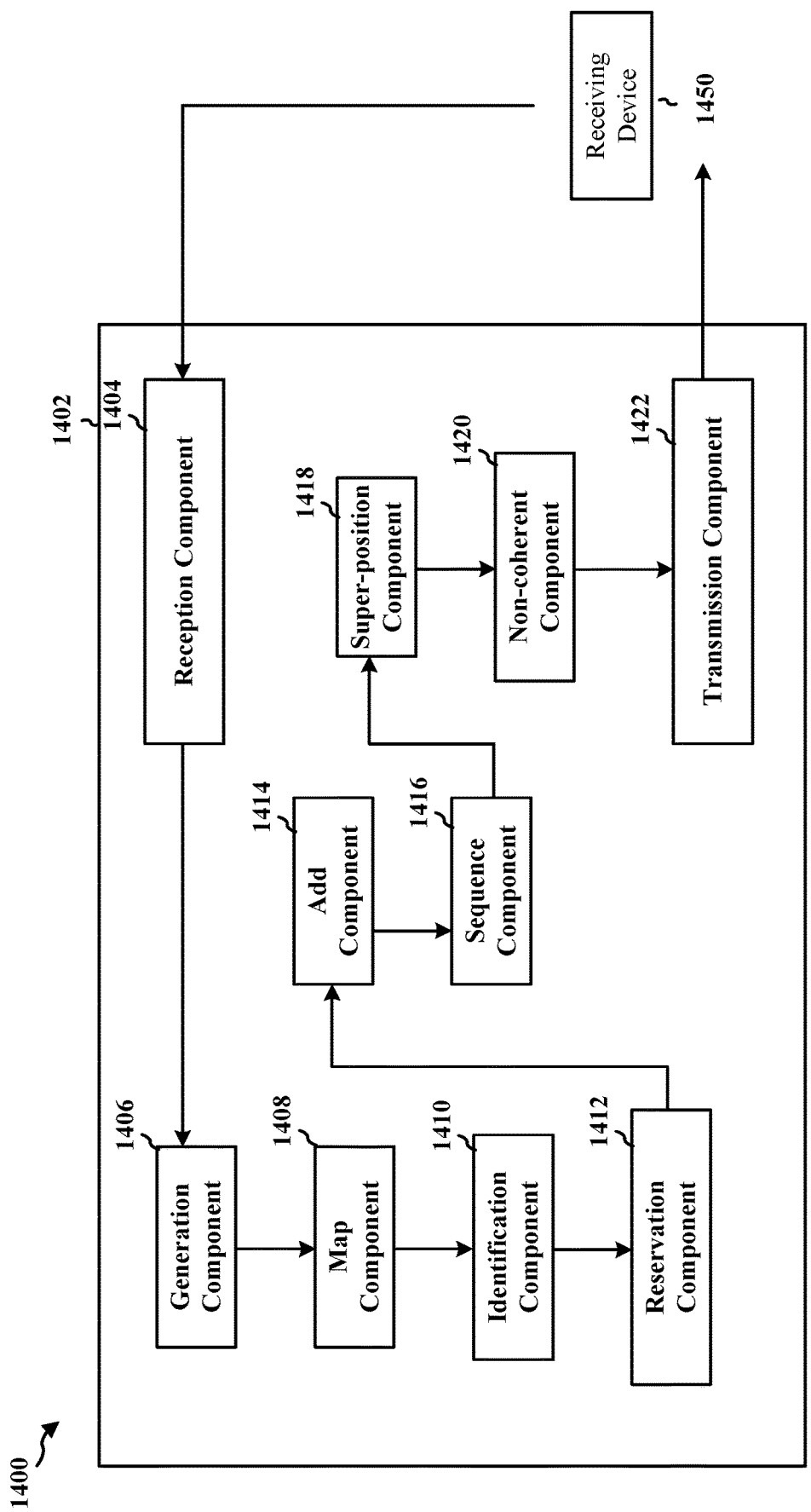
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a transmitting device. In some aspects, the apparatus may comprise a UE or a component of the UE. In some aspects, the apparatus may comprise a base station or a component of a base station. The apparatus includes a reception component 1404 that may be configured to receive various types of signals/messages and/or other information from other device, including, for example, the receiving device 1450. The apparatus includes a generation component 1406 that may generate a non-coherent transmission signal, e.g., as described in connection with 1302 of FIG. 13. The apparatus includes a map component 1408 that may map one or more subset of bits into a respective one or more sequences, e.g., as described in connection with 1304 of FIG. 13. The apparatus includes an identification component 1410 that may add identification information to each of M groups of bits to form M bit strings, e.g., as described in connection with 1306 of FIG. 13. The apparatus includes a reservation component 1412 that may reserve one or more of the k bits to include the identification information, e.g., as described in connection with 1308 of FIG. 13. The apparatus includes an add component 1414 that may add a prefix or suffix comprising the identification information to each of the M groups of bits to form the M bit strings, e.g., as described in connection with 1310 of FIG. 13. The apparatus includes a sequence component 1416 that may map each of the M bit strings to the respective sequence of the length n, e.g., as described in connection with 1312 of FIG. 13. The apparatus includes a super-position component 1418 that may super-position each of the respective sequences of the length n to generate a super-positioned sequence of length n, e.g., as described in connection with 1314 of FIG. 13. The apparatus includes a non-coherent component 1420 that may transmit the non-coherent transmission signal to a receiving device, e.g., as described in connection with 1316 of FIG. 13. The apparatus includes a transmission component 1422 that may be configured to transmit various types of signals/messages and/or other information to other devices, including, for example, the receiving device 1450.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
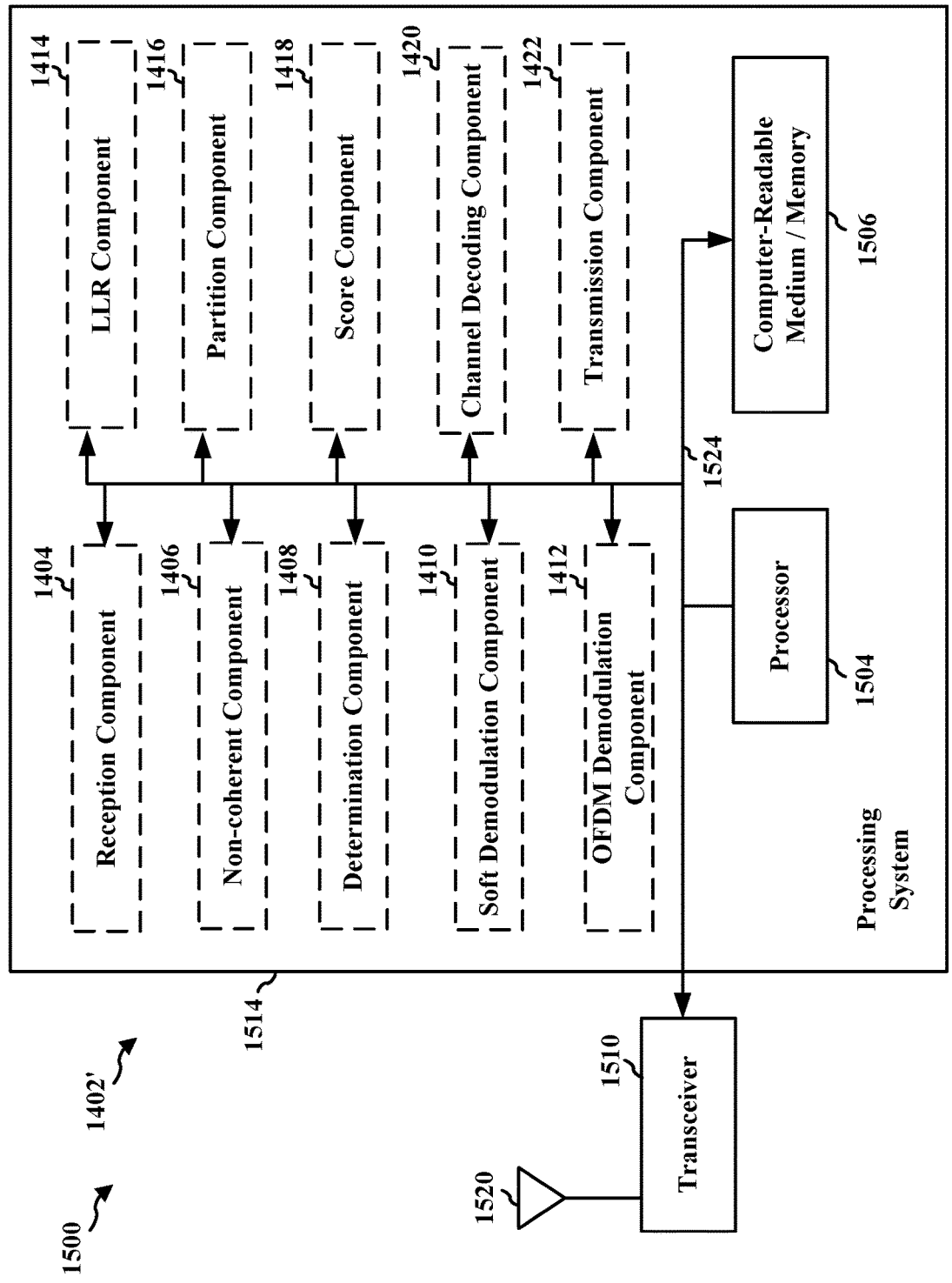
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1422, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420, 1422. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3). The processing system 1514 may be a component of the UE 350 and may include the memory 360 and/or at least one of the TX processor 368, the RX processor 356, and the controller/processor 359. Alternatively, the processing system 1514 may be the entire UE (e.g., see 350 of FIG. 3).

In one configuration, the apparatus 1402/1402' for wireless communication includes means for generating a non-coherent transmission signal including mapping a subset of bits into a sequence of complex symbols. The apparatus includes means for transmitting the non-coherent transmission signal to a receiving device. The means for generating the non-coherent transmission signal may be configured to map one or more subsets of coded bits into a respective sequence of complex symbols. Each group is mapped into a respective sequence of a length n of a plurality of sequences. The means for generating the non-coherent transmission signal may be configured to add identification information to each of M groups of bits to form M bit strings. The subset of bits are partitioned into groups. The means for generating the non-coherent transmission signal may be configured to map each of the M bit strings to the respective sequence of the length n. The means for generating the non-coherent transmission signal may be configured to super-position each of the respective sequences of the length n to generate a super-positioned sequence of length n. The means for generating the non-coherent transmission signal, to add identification information, may be configured to reserve one or more of the k bits to include the identification information. The means for generating the non-coherent transmission signal, to add identification information, may be configured to add a prefix or suffix comprising the identification information to each of the M groups of bits to form the M bit strings. The means for generating the non-coherent transmission signal may be configured to partition the one or more subset of bits into M groups of bits to form M bit strings. The means for generating the non-coherent transmission signal may be configured to map each of the M bit strings to the respective sequence based on a respective sequence set of the length n. The means for generating the non-coherent transmission signal may be configured to super-position each of the respective sequences of the length n to generate a super-positioned sequence of length n. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure relates to a non-coherent communication system, where a receiving device may be configured to determine or decode information received from a transmitting device without performing any channel estimation. Furthermore, the transmitting device may be configured to not transmit any pilot/DMRS, which may provide additional resources to transmit the information to the receiving device. At least one advantage of the disclosure is that the non-coherent scheme may be utilized in the uplink for coverage enhancement (e.g., PUCCH and/or PUSCH channels). At least another advantage of the disclosure is that the non-coherent scheme may be used for preamble-less random access in a 2-step RACH procedure. For example, instead of transmitting preamble and data (e.g., message A), the transmitting device may directly transmit the data using the non-coherent communication without transmitting DMRS and the preamble. Another advantage is that the non-coherent scheme may be used on PDCCH targeting for complexity reduction, which may reduce the complexity of blind decoding. In addition, the non-coherent scheme may be used on a discovery channel in sidelink communication (e.g., UE to UE communication).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, comprising:
   dividing an information payload comprising a set of bits into multiple subsets of bits;
   mapping each of the multiple subsets of bits into a respective sequence of complex symbols, wherein different groups of the multiple subsets of bits are mapped into respective sequences of complex symbols having different cross-correlations between the different sequences based on a varying difference in bits between the different groups;
   skipping an insertion of a pilot signal into the respective sequence, the pilot signal enabling a receiving device to perform a channel estimation;
   generating a non-coherent transmission signal based on the respective sequences by concatenating the respective sequences to form the non-coherent transmission signal when a signal to noise ratio is low; and
   transmitting the non-coherent transmission signal to the receiving device.

2. The method of claim 1, wherein the set of bits comprises a set of coded bits.

3. The method of claim 2, wherein the coded bits are generated from at least one of a cyclic redundancy check (CRC) code, an error correction code, or a rate matching feature.

4. The method of claim 1, wherein the mapping of each of the multiple subsets of bits into the respective sequence of complex symbols further comprises:
   mapping two bit groups into two sequences having a larger cross-correlation when two bit groups differ in fewer bits; and
   mapping the two bit groups into two sequences having smaller cross correlation when the two bit groups differ in more bits.

5. The method of claim 1, wherein the generating the non-coherent transmission signal comprises:
   adding identification information to each of M groups of bits to form M bit strings, wherein the multiple subsets of bits are partitioned into groups;
   mapping each of the M bit strings to the respective sequence of complex symbols with length n; and
   super-positioning each of the respective sequences of the length n to generate a super-positioned sequence of length n.

6. The method of claim 5, wherein the identification information indicates an identity of each of the groups from the M groups of bits involved in the super-positioned sequence.

7. The method of claim 1, wherein generating the non-coherent transmission signal comprises:
   partitioning the multiple subsets of bits into M groups of bits to form M bit strings;
   mapping each of the M bit strings to the respective sequence based on a sequence set of length n; and
   super-positioning each of the respective sequences of the length n to generate a super-positioned sequence of the length n.

8. An apparatus for wireless communication at a transmitting device, comprising:
   means for dividing an information payload comprising a set of bits into multiple subsets of bits;
   means for mapping each of the multiple subsets of bits into a respective sequence of complex symbols, wherein different groups of the multiple subsets of bits are mapped into respective sequences of complex symbols having different cross-correlations between the different sequences based on a varying difference in bits between the different groups;
   means for skipping an insertion of a pilot signal into the respective sequence, the pilot signal enabling a receiving device to perform a channel estimation;
   means for generating a non-coherent transmission signal based on the respective sequences by concatenating the respective sequences to form the non-coherent transmission signal when a signal to noise ratio is low; and
   means for transmitting the non-coherent transmission signal to the receiving device.

9. The apparatus of claim 8, wherein the set of bits comprises a set of coded bits.

10. The apparatus of claim 9, wherein the coded bits are generated from at least one of a cyclic redundancy check (CRC) code, an error correction code, or a rate matching feature.

11. The apparatus of claim 8, wherein to map the subsets of bits into the respective sequences of complex symbols is configured to:
 map two bit groups into two sequences having a larger cross-correlation when the two bit groups differ in fewer bits, and
 map the two bit groups into two sequences having a smaller cross-correlation when the two bit groups differ in more bits.

12. The apparatus of claim 8, wherein the means for generating the non-coherent transmission signal is configured to:
 add identification information to each of M groups of bits to form M bit strings, wherein the multiple subsets of bits are partitioned into groups;
 map each of the M bit strings to the respective sequence of complex symbols with length n; and
 super-position each of the respective sequences of the length n to generate a super-positioned sequence of length n.

13. The apparatus of claim 12, wherein the identification information indicates an identity of each of the groups from the M groups of bits involved in the super-positioned sequence.

14. The apparatus of claim 8, wherein the means for generating the non-coherent transmission signal is configured to:
 partition the multiple subsets of bits into M groups of bits to form M bit strings;
 map each of the M bit strings to the respective sequences based on a respective sequence set of length n; and
 super-position each of the respective sequences of the length n to generate a super-positioned sequence of the length n.

15. An apparatus for wireless communication at a transmitting device, comprising:
 a memory; and
 at least one processor coupled to the memory and configured to:
  divide an information payload comprising a set of bits into multiple subsets of bits;
  map each of the multiple subsets of bits into a respective sequence of complex symbols, wherein different groups of the multiple subsets of bits are mapped into respective sequences of complex symbols having different cross-correlations between the different sequences based on a varying difference in bits between the different groups;
  skip an insertion of a pilot signal into the respective sequence, the pilot signal enabling a receiving device to perform a channel estimation;
  generate a non-coherent transmission signal based on the respective sequences by concatenating the respective sequences to form the non-coherent transmission signal when a signal to noise ratio is low; and
  transmit the non-coherent transmission signal to the receiving device.

16. The apparatus of claim 15, wherein the set of bits comprises a set of coded bits.

17. The apparatus of claim 16, wherein the coded bits are generated from at least one of a cyclic redundancy check (CRC) code, an error correction code, or a rate matching feature.

18. The apparatus of claim 15, wherein to map the multiple subsets of bits into the sequences of complex symbols, the at least one processor is further configured to:
 map two bit groups into two sequences having a larger cross-correlation when the two bit groups differ in fewer bits, and
 map the two bit groups into two sequences having a smaller cross correlation, when two bit groups differ in more bits.

19. The apparatus of claim 15, wherein to generate the non-coherent transmission signal, the at least one processor is configured to:
 add identification information to each of M groups of bits to form M bit strings, wherein the multiple subset of bits are partitioned into groups;
 map each of the M bit strings to the respective sequence of complex symbols with length n; and
 super-position each of the respective sequences of the length n to generate a super-positioned sequence of length n.

20. The apparatus of claim 19, wherein the identification information indicates an identity of each of the groups from the M groups of bits involved in the super-positioned sequence.

21. The apparatus of claim 15, wherein the at least one processor configured to generate the non-coherent transmission signal is further configured to:
 partition the multiple subsets of bits into M groups of bits to form M bit strings;
 map each of the M bit strings to the respective sequence of complex symbols based on a respective sequence set of length n; and
 super-position each of the respective sequences of the length n to generate a super-positioned sequence of length n.

22. A non-transitory computer-readable medium storing computer executable code, the code when executed by a processor causes the processor to:
 divide an information payload comprising a set of bits into multiple subsets of bits;
 map each of the multiple subsets of bits into a respective sequence of complex symbols, wherein different groups of the multiple subsets of bits are mapped into respective sequences of complex symbols having different cross-correlations between the different sequences based on a varying difference in bits between the different groups;
 skip an insertion of a pilot signal into the respective sequence, the pilot signal enabling a receiving device to perform a channel estimation;
 generate a non-coherent transmission signal based on the respective sequences by concatenating the respective sequences to form the non-coherent transmission signal when a signal to noise ratio is low; and
 transmitting the non-coherent transmission signal to the receiving device.

23. The non-transitory computer-readable medium of claim 22, wherein the set of bits comprises a set of coded bits.

24. The non-transitory computer-readable medium of claim 23, wherein the coded bits are generated from at least one of a cyclic redundancy check (CRC) code, an error correction code, or a rate matching feature.

25. The non-transitory computer-readable medium of claim 22, wherein to map the multiple subsets of bits into the sequences of complex symbols, the code further causes the processor to:
- map two bit groups into two sequences having a larger cross-correlation when two bit groups differ in fewer bits, and
- map the two bit groups into two sequences having a smaller cross correlation, when two bit groups differ in more bits.

26. The non-transitory computer-readable medium of claim 22, wherein to generate the non-coherent transmission signal, the code further causes the processor to:
- add identification information to each of M groups of bits to form M bit strings, wherein the multiple subset of bits are partitioned into groups;
- map each of the M bit strings to the respective sequence of complex symbols with length n; and
- super-position each of the respective sequences of the length n to generate a super-positioned sequence of length n.

\* \* \* \* \*